United States Patent
Koizumi (10) Patent No.: US 6,414,798 B1
(45) Date of Patent: Jul. 2, 2002

(54) EYEPIECE FOR PICTURE DISPLAY DEVICE

(75) Inventor: Noboru Koizumi, Omiya (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 190 days.

(21) Appl. No.: 09/638,064

(22) Filed: Aug. 15, 2000

(30) Foreign Application Priority Data

Aug. 31, 1999 (JP) .......................... 11-244513

(51) Int. Cl.[7] .............................. G02B 3/00; G02B 13/22
(52) U.S. Cl. ...................................... 359/643; 359/644
(58) Field of Search ........................ 359/643, 644, 359/645, 791, 792, 795, 796, 291, 292, 290

(56) References Cited

U.S. PATENT DOCUMENTS 5,268,790 A * 12/1993 Chen ........................... 359/558
5,808,810 A * 9/1998 Mihara ....................... 359/690

FOREIGN PATENT DOCUMENTS

| JP | H6-308396 | 11/1994 |
| JP | 2000-1053244 | 4/2000 |

* cited by examiner

*Primary Examiner*—Ricky Mack
*Assistant Examiner*—Omar Hindi
(74) *Attorney, Agent, or Firm*—Arnold International; Bruce Y. Arnold (57) ABSTRACT

An eyepiece, consisting of two lens groups, is lighter in weight and more compact than known previously, yet has aberrations that are favorably corrected despite the eyepiece having a large exit pupil diameter. This is accomplished by including a predetermined diffraction optical element (DOE) surface on one of the optical elements in order to minimize the number of lens elements that are required, while simultaneously ensuring the image is of high quality. Thus, a high quality image may be observed even while walking, riding in a vehicle, or the like. In order from the eye side, the first lens group has positive refractive power with its surface nearest the eye side being convex and its surface farthest from the eye side being concave. The first lens group may be formed of a single lens element or a pair of lens elements that are cemented together. Among the two lens groups, the eyepiece includes at least one negative lens element and at least two positive lens elements. Preferably, specified conditions are satisfied to ensure that the eyepiece is compact, yet well-corrected for aberrations.

10 Claims, 12 Drawing Sheets

EMBODIMENT 1

EYEPIECE FOR PICTURE DISPLAY DEVICE

BACKGROUND OF THE INVENTION

Various types of picture display devices are conventionally known that display preferred images on picture display elements, such as liquid crystal display panels, and wherein the display images are magnified and observed with an eyepiece.

As an eyepiece used with such picture display devices, Japanese Laid Open Patent Application No. 6-308396 is known. This eyepiece has a curved object plane and aspherical lens element surfaces, thus providing flat and clear images up to the periphery of the image plane while employing only a small number of lens elements.

However, aberrations are favorably corrected in the above-mentioned eyepiece only when the diameter of the exit pupil is about 4 mm (of the embodiments thereof, the brightest one has an $F_{NO}$ of 3.75). The average person's pupil diameter is considered to be about 3 to 4 mm. No major problems appear even with such a small exit pupil diameter when the eyepiece is used in a motionless state. However, an observer's pupil and the exit pupil of an eyepiece usually deviate from perfect alignment by as much as 3 to 5 mm if the observation device is used under conditions other than in a motionless state, such as walking, riding in a vehicle, or the like. Therefore, unless various aberrations are favorably corrected out to a large exit pupil diameter, the quality of an observed image will deteriorate under conditions where motions between the eyepiece and the observer occur.

The applicant has already disclosed an eyepiece for a picture display device in Japanese Laid Open Patent Application No. 2000-105344 to solve these problems. This eyepiece is relatively light and compact, yet it has a large exit pupil diameter so that high quality images may be observed under conditions such as walking, riding in a vehicle, or the like.

BRIEF SUMMARY OF THE INVENTION

Although the eyepiece disclosed in Japanese Laid Open Patent Application No. 2000-105344 provides a high quality image under conditions such as walking, riding in a vehicle, or the like, a reduction in the number of lens elements of the eyepiece is desirable since it would make the eyepiece weigh less and be more compact.

Thus, an object of the present invention is to provide an even lighter and more compact eyepiece for a picture display device than in the prior art that is suitable for the viewing of high quality images even while walking, riding in vehicles, or the like.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

The present invention is an eyepiece for picture display devices that is used to magnify and observe images displayed on various types of picture display devices. More particularly, the present invention is particularly useful in magnifying images formed in night vision optical devices by image intensifiers which amplify feeble light so as to form an observable image under very low light conditions.

The eyepiece is formed of only two lens groups. In order from the eye of an observer using the eyepiece, the first group has positive refractive power and is formed of a single lens element or a pair of lens elements that are cemented together. The surface of the first lens group nearest the eye is convex and the surface of the first lens group most remote from the eye is concave. Further, the first and second lens groups together include: at least one negative lens element, at least two positive lens elements, and at least one diffraction optical element surface.

Moreover, it is desirable that the eyepiece satisfy the following Conditions (1) to (4):

| | |
|---|---|
| $1.1 < f_1/f < 2.0$ | Condition (1) |
| $1.0 < f_2/f < 2.0$ | Condition (2) |
| $-2.0 < R_{IM}/f < -1.0$ | Condition (3) |
| $-1.4 < f \times \Sigma (1/fn_1) < -0.4$ | Condition (4) | where f is the focal length of the eyepiece, $f_1$ is the focal length of the first lens group, $f_2$ is the focal length of the second lens group, $R_{IM}$ is the radius of curvature of a picture display surface that the eyepiece is used to observe, and $\Sigma(1/fn_i)$ is the reciprocal of the focal length fni of the negative lens element of the eyepiece where there is only one negative lens element in the eyepiece, or is the sum of reciprocals of the focal lengths of the negative lens elements of the eyepiece where there is more than one negative lens element in the eyepiece.

Furthermore, the eyepiece has at least one aspherical surface.

Additionally, the "focal length $fn_i$" refers to the focal length of the $i^{th}$ negative lens element of the eyepiece from the eye-side. Where the eyepiece includes a negative lens element that is cemented to another lens element, the focal length, in air, of only the negative lens element portion of the cemented lens is considered.

The invention will first be explained as to those features that are applicable to each embodiment using FIG. 1, which is representative for this purpose. The eyepiece of the invention is arranged in the ocular portion of a night vision optical device and is used to observe images formed on a picture display surface 1 of an image intensifier (not illustrated). More specifically, the eyepiece consists of, in order from the eye side, a first lens group $G_1$ and a second lens group $G_2$. The first group $G_1$ has positive refractive power and consists of either a single lens element or a pair of lens elements that are cemented together. The surface of the first lens group $G_1$ nearest the eye side is convex and the surface farthest from the eye side is concave. Among the two lens groups of the eyepiece there is provided at least one negative lens element, at least two positive lens elements, and at least one diffraction optical element (hereinafter DOE) surface. Additionally, at least one lens element surface is aspherical.

An objective lens (not illustrated) forms a picture display surface 1 using an image intensifier (not shown). Light traveling along optical axis X from the picture display surface 1 is then incident onto the eyepiece where it enters lens group $G_2$, is transmitted next to lens group $G_1$ and then enters the eye of the observer, which is positioned at the eye point, E.P.

The diffraction optical surface is defined by an optical path difference Ø (Y) given in Equation (1) below.

$$\emptyset(Y)=(P_2Y^2+P_4Y^4+P_6Y^6+\ldots)\times\lambda \quad \text{Equation(1)}$$

where

Ø (Y) is the phase contrast function of the diffraction optical surface,

Y is the height from the optical axis,

λ is the wavelength of light, and $P_2$, $P_4$, $P_6$ . . . are second, fourth, sixth order . . . (etc.) coefficients.

Specifically, the function of the optical path difference Ø (Y) indicates that the DOE surface has paraxial positive power when $P_2$ is negative. Additionally, when the coefficient $P_4$ is positive, the DOE surface has increasing negative refractive power towards its periphery.

The shape of the aspherical surface is expressed by Equation (2) below.

$$Z=((Y^2/R)/(1+(1-KY^2/R^2)^{1/2})+A_4Y^4+A_6Y^6+A_8Y^8+A_{10}Y^{10} \quad \text{Eq. (2)}$$

where

Z is the length of a perpendicular from a point on the aspherical surface at the distance Y from the optical axis to the tangential plane at the vertex of the aspherical surface, Y is the distance from the optical axis, K is k+1 where k is the conic coefficient, R is the radius of curvature near the vertex of the aspherical surface, and $A_4$, $A_6$, $A_8$ and $A_{10}$ are coefficients of the aspherical surface.

The functioning of the eyepiece and the purpose of Conditions (1) to (4) in the preferred embodiments will now be explained from a viewpoint that the light transits the eyepiece in a direction from the eye to the display image. Although the light actually travels from the display image 1 through the eyepiece to the eye at the position E.P., if the ray directions were to be reversed, the light paths of the rays would not change in any manner other than reversing direction. Thus, although the below description of the functioning of the eyepiece and the purpose of Conditions (1) to (4) is from the viewpoint of the rays traveling from the eye to the display image, it accurately describes the functioning of the eyepiece, since the actual incoming light follows the same ray paths described below except for the ray directions being in the opposite direction.

In order to keep the outside diameter of the lens elements of the eyepiece small, it is necessary to prevent the light rays from diverging. This is accomplished by providing positive power to the first lens group $G_1$ on the eye side. The surface of this lens group nearest the eye side should be convex and the surface of this lens group farthest from the eye side should be concave. Thus, when the first lens group consists of a single lens element, the shape of the single lens element should be that of a positive meniscus lens element. Additionally, when the first lens group $G_1$ consists of a pair of lens elements that are cemented together, the cemented lenses should have a convex surface nearest the eye side and a concave surface farthest from the eye side.

However, refracting light rays in the above manner results in the occurrence of aberrations. The eyepiece of the present invention can correct these aberrations even with a small number of lens elements by employing at least one DOE surface. As is known, DOE surfaces have dispersive characteristics that are opposite that of refractive lenses (i.e., the dispersion is as if the lens element has a negative Abbe constant). Thus, it is possible to correct for chromatic aberration by combining a lens element having positive refractive power and a DOE having positive power.

Furthermore, by introducing at least one aspheric surface, spherical aberration and coma may be corrected. As described above, a DOE surface may correct for chromatic aberration, and this would otherwise allow the DOE surface to entirely substitute for a negative lens element that would normally be required in the eyepiece for correction of chromatic aberration. However, since an appropriate eye relief (distance from the eyepiece to the eye position at E.P.) is required to prevent the observer's eyelashes from contacting the eyepiece during use, at least one negative lens element in the eyepiece is nonetheless required. In the present invention, the minimum eye relief required to prevent the observer's eyelashes from contacting the eyepiece during use turns out to be a value that equals 0.92 times the focal length of the eyepiece. Thus, the eyepiece of the present invention must be equipped with at least one negative lens element in order to provide a sufficient eye relief.

Conditions (1) to (4) will now be explained. Condition (1) defines the focal length of the first lens group $G_1$, in order from the eye side, relative to the focal length of the eyepiece. If the upper limit is not satisfied, the refractive power of the first lens group $G_1$ becomes excessive, causing the spherical aberration and coma to become so large that correction of these aberrations will be difficult. If the lower limit of Condition (1) is not satisfied, the power of the first lens group $G_1$ relative to the power of the eyepiece is too weak, resulting in the outside diameter of the lens elements of the second lens group $G_2$ being too large. Thus, the eyepiece is no longer able to be compact.

Condition (2) defines the focal length of the second lens group $G_2$, in order from the eye side, relative to the focal length of the eyepiece. If the upper limit is not satisfied, the positive power of the second lens group $G_2$ will be too strong, so that it will be difficult to correct spherical aberration and coma. If the lower limit is not satisfied, the outside diameter of the lens elements of the second lens group will become too large, and the eyepiece will not be compact.

Condition (3) defines the range of acceptable focal lengths of the eyepiece relative to the radius of curvature of the picture display surface 1 of the image intensifier. Because the eyepiece has overall positive refractive power, its curvature of field is such that the picture display surface 1 should be concave in order to match the curvature of field that occurs due to the eyepiece having positive refractive power overall. The amount of curvature of field is closely related to the power of the eyepiece, so that there is a range in which the picture display surface 1 must lie in order for the eyepiece curvature of field to match the curvature of the image display surface. Satisfying Condition (3) enables the curvature of field of the eyepiece to match the curvature of the picture display surface 1 of the image intensifier while keeping the shift of focal length with wavelength acceptably small.

Condition (4) defines the refractive power of the negative lens elements in the eyepiece relative to the refractive power of the eyepiece. If the lower limit of Condition (4) is not satisfied, the overall power of the negative lenses becomes too strong, causing transiting rays to diverge from the optical axis and resulting in the outside diameter of the later lenses in the light path becoming too large, so that the eyepiece will no longer be compact and coma will increase. On the other hand, if the upper limit is not satisfied, it becomes difficult to maintain sufficient eye relief to provide enough clearance for the observer's eyelashes.

Embodiments 1 to 4 of the present invention will now be explained in detail.

Embodiment 1

Figure 1:
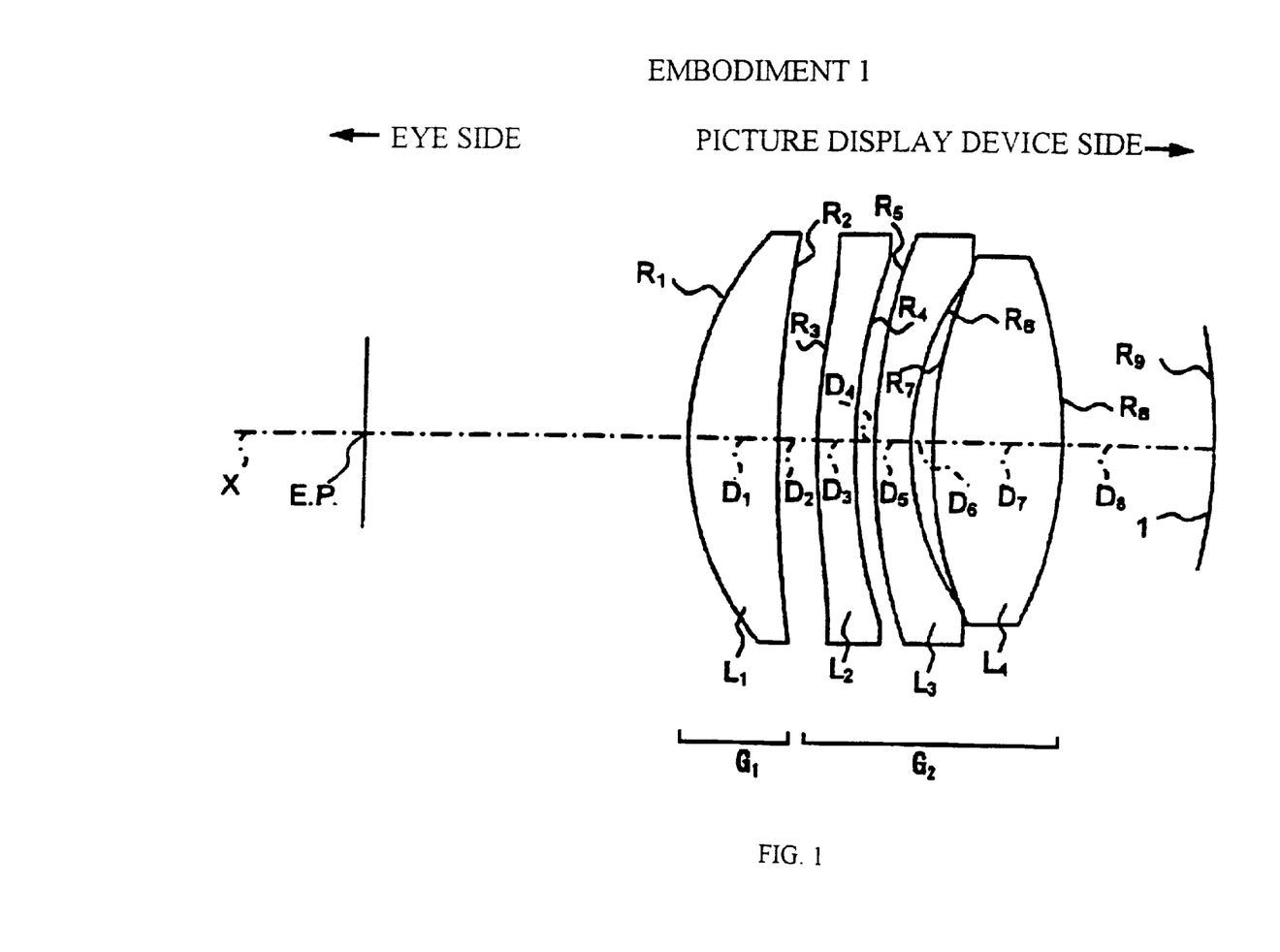
FIG. 1 shows the basic lens element configuration of an eyepiece for a picture display device according to Embodiment 1.

FIG. 1 shows the eyepiece of Embodiment 1. In order from the eye side, the eyepiece consists of a first lens group $G_1$ and a second lens group $G_2$. The first lens group $G_1$ is formed of a single positive meniscus lens element with its convex surface on the eye side. The second lens group $G_2$ is formed of, in order from the eye side: a second lens element $L_2$ that is shaped as a meniscus lens with its convex surface on the eye side; a third lens element $L_3$ having negative refractive power, also shaped as a meniscus lens with its convex surface on the eye side; and, a fourth lens element $L_4$ of positive refractive power that is a biconvex lens having surfaces of different radii of curvature, and with the surface of smaller radius of curvature on the eye side. Additionally, the surface of the second lens element $L_2$ nearest the eye side is aspherical and includes a DOE surface, so that the diffractive zones on the surface are expressed by the above Equation (1) and the underlying surface profile is expressed by the above Equation (2).

Table 1 below shows the surface number # in order from the eye side, the radius of curvature R (in mm) of each surface, the on-axis spacing between surfaces, as well as the index of refraction $N_d$ and Abbe constant $v_d$ (relative to the sodium d-line, i.e., $\lambda$=587.6 nm) of the lens elements of this embodiment. In the middle portion of the table, the values for the coefficients $P_2$, $P_4$ and $P_6$ of Equation (1) above are listed for the DOE surface (surface #3). In the bottom portion of the table, the respective coefficients K, $A_4$, $A_6$, $A_8$ and $A_{10}$ of Equation (2) are listed for the underlying aspherical surface shape of surface #3.

Moreover, in Embodiments 1 to 4, the distance from the eyepiece to the eye point E.P. is set at 25 mm.

TABLE 1

| # | R | D | $N_d$ | $V_d$ |
|---|---|---|---|---|
| 1 | 22.000 | 6.910 | 1.71264 | 55.9 |
| 2 | 92.973 | 3.000 | | |
| 3 (DOE and Aspherical Surface) | 41.566 | 3.000 | 1.65180 | 33.4 |
| 4 | 40.932 | 1.500 | | |
| 5 | 41.587 | 2.858 | 1.85000 | 22.5 |
| 6 | 19.746 | 1.737 | | |
| 7 | 31.688 | 9.990 | 1.69093 | 57.0 |
| 8 | −31.734 | 11.505 | | |
| 9 (Picture Display Surface) | −40.000 | | | |

| Coefficients of DOE Surface (Surface #3) | | |
|---|---|---|
| $P_2$ | $P_4$ | $P_6$ |
| −5.7176245 | −3.9663963 × 10$^{-4}$ | 9.1326560 × 10$^{-6}$ |

TABLE 1-continued

Coefficients of Aspherical Surface (Surface #3)

| K | $A_4$ | $A_6$ | $A_8$ | $A_{10}$ |
|---|---|---|---|---|
| 1.0000000 | $-2.7647230 \times 10^{-5}$ | $-1.3064132 \times 10^{-8}$ | $-1.4180157 \times 10^{-10}$ | $6.1355521 \times 10^{-13}$ |

Embodiment 2

Figure 2:
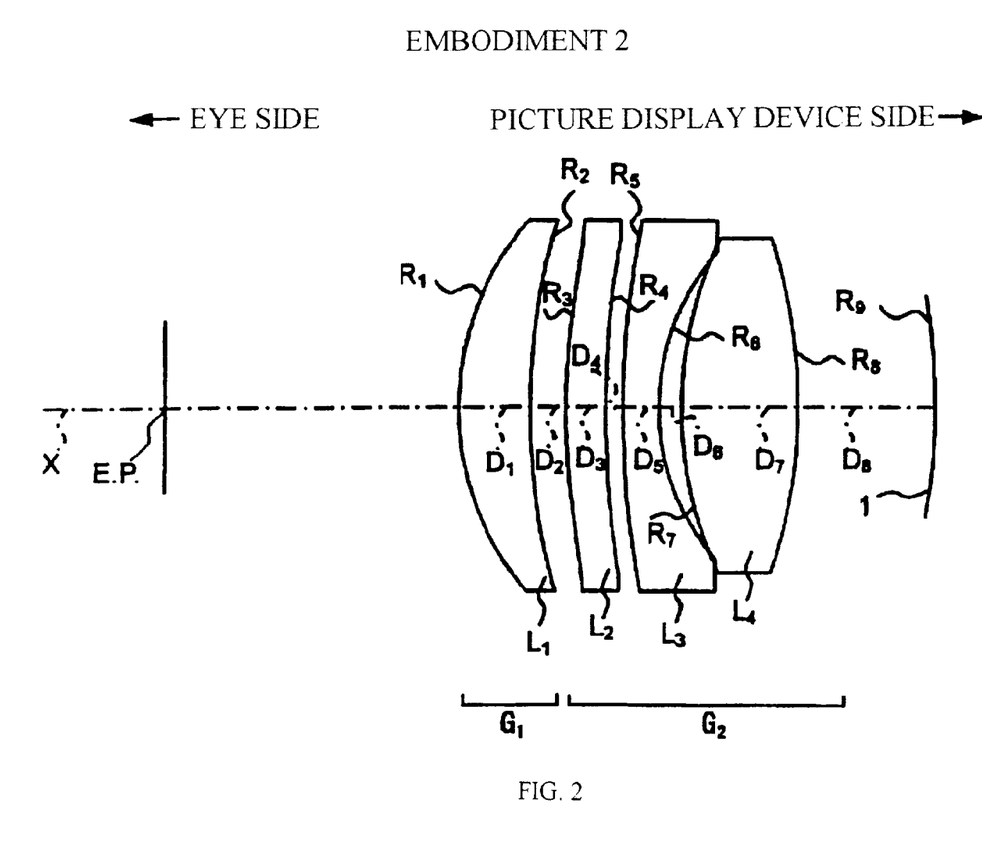
FIG. 2 shows the basic lens element configuration of an eyepiece for a picture display device according to Embodiment 2.

As shown in FIG. 2, the eyepiece of Embodiment 2 has roughly the same configuration as the eyepiece of Embodiment 1. This embodiment differs from Embodiment 1 in that the DOE surface is formed on the surface on the picture display surface side of the second lens element $L_2$ (i.e., surface #4). Once again the aspherical surface is formed at the surface on the eye side of the second lens element $L_2$ (i.e., surface #3)

Table 2 below shows the surface number # in order from the eye side, the radius of curvature R (in mm) of each surface, the on-axis spacing between surfaces, as well as the index of refraction $N_d$ and Abbe constant $v_d$ (relative to the sodium d-line, i.e., λ=587.6 nm) of the lens elements of this embodiment. In the middle portion of the table, the values for the coefficients $P_2$, $P_4$ and $P_6$ of Equation (1) above are listed for the DOE surface (surface #4). In the bottom portion of the table, the respective coefficients K, $A_4$, $A_6$, $A_8$ and $A_{10}$ of Equation (2) above which define the shape of the aspherical surface (surface #3) are listed.

Embodiment 3

Figure 3:
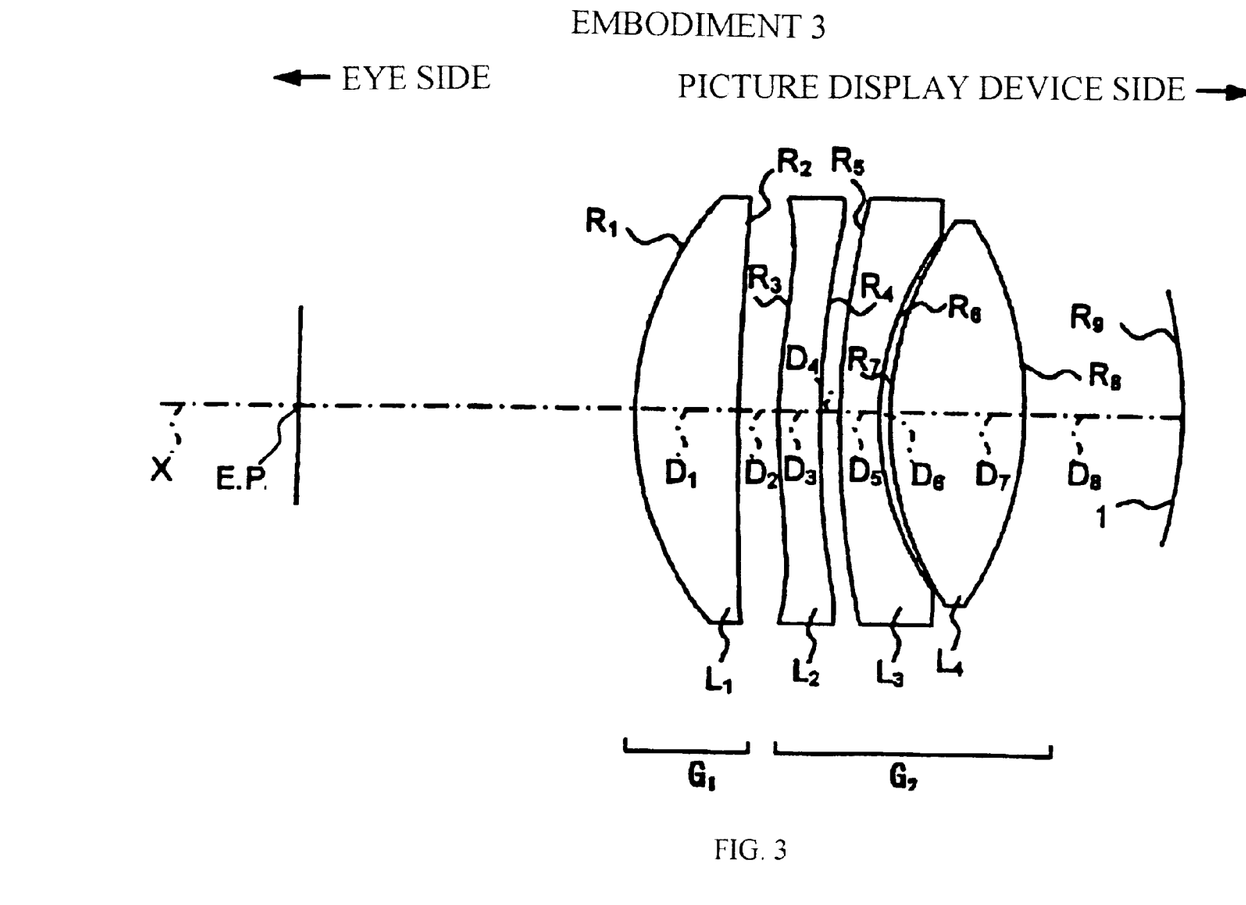
FIG. 3 shows the basic lens element configuration of an eyepiece for a picture display device according to Embodiment 3.

As shown in FIG. 3, the eyepiece of Embodiment 3 has roughly the same configuration as the eyepiece of Embodiment 1. However, this embodiment differs from Embodiment 1 in that the DOE surface is formed at the surface on the display surface side of the first lens element $L_1$ (i.e., surface #2), and the aspherical surface is formed at the surface on the eye side of the second lens element $L_2$ (i.e., surface #3).

Table 3 below shows the surface number # in order from the eye side, the radius of curvature R (in mm) of each surface, the on-axis spacing between surfaces, as well as the index of refraction $N_d$ and Abbe constant $v_d$ (relative to the sodium d-line, i.e., λ=587.6 nm) of the lens elements of this embodiment. In the middle portion of the table, the values for the coefficients $P_2$, $P_4$ and $P_6$ of Equation (1) above are listed for the DOE surface (surface #2). In the bottom portion of the table, the respective coefficients K, $A_4$, $A_6$, $A_8$ and $A_{10}$ of Equation (2) above which define the shape of the aspherical surface (surface #3) are listed.

TABLE 2

| # | R | D | $N_d$ | $V_d$ |
|---|---|---|---|---|
| 1 | 22.000 | 6.177 | 1.81356 | 46.6 |
| 2 | 52.362 | 3.000 | | |
| 3 (Aspherical Surface) | 43.750 | 3.415 | 1.79390 | 38.8 |
| 4 (DOE Surface) | 79.765 | 1.500 | | |
| 5 | 75.764 | 3.000 | 1.77273 | 26.4 |
| 6 | 18.415 | 1.913 | | |
| 7 | 30.555 | 9.990 | 1.77846 | 47.8 |
| 8 | −38.609 | 11.681 | | |
| 9 (Picture Display Surface) | −50.000 | | | |

DOE Surface (Surfce #4)

| $P_2$ | $P_4$ | $P_6$ |
|---|---|---|
| $-1.1290941 \times 10$ | $3.6340439 \times 10^3$ | $-6.6010062 \times 10^{-6}$ |

Aspherical Surface (Surface #3)

| K | $A_4$ | $A_6$ | $A_8$ | $A_{10}$ |
|---|---|---|---|---|
| 1.0000000 | $-2.1348974 \times 10^5$ | $6.5900761 \times 10^{-9}$ | $-1.4255120 \times 10^{-10}$ | $4.7071487 \times 10^{-13}$ |

TABLE 3

| # | R | D | $N_d$ | $V_d$ |
|---|---|---|---|---|
| 1 | 22.000 | 7.618 | 1.59220 | 61.5 |
| 2 (DOE Surface) | 243.077 | 3.000 | | |
| 3 (Aspherical Surface) | 42.550 | 3.078 | 1.50000 | 64.7 |
| 4 | 66.003 | 1.500 | | |
| 5 | 62.115 | 3.000 | 1.85000 | 22.5 |
| 6 | 20.403 | 0.810 | | |
| 7 | 22.793 | 9.990 | 1.54730 | 63.2 |
| 8 | −23.817 | 11.765 | | |
| 9 (Picture Display Surface) | −30.000 | | | |

TABLE 3-continued

Coefficients of DOE Surface (Surface #2)

| $P_2$ | $P_4$ | $P_6$ |
|---|---|---|
| −1.3822181 | −3.0692477 × 10⁻³ | 3.3502052 × 10⁻⁶ |

Coefficients of Aspherical Surface (Surface #3)

| K | $A_4$ | $A_6$ | $A_8$ | $A_{10}$ |
|---|---|---|---|---|
| 1.0000000 | −0.4081048 × 10⁻⁴ | −0.1457373 × 10⁻⁷ | −0.4184304 × 10⁻⁹ | 0.1507072 × 10⁻¹¹ |

Embodiment 4

Figure 4:
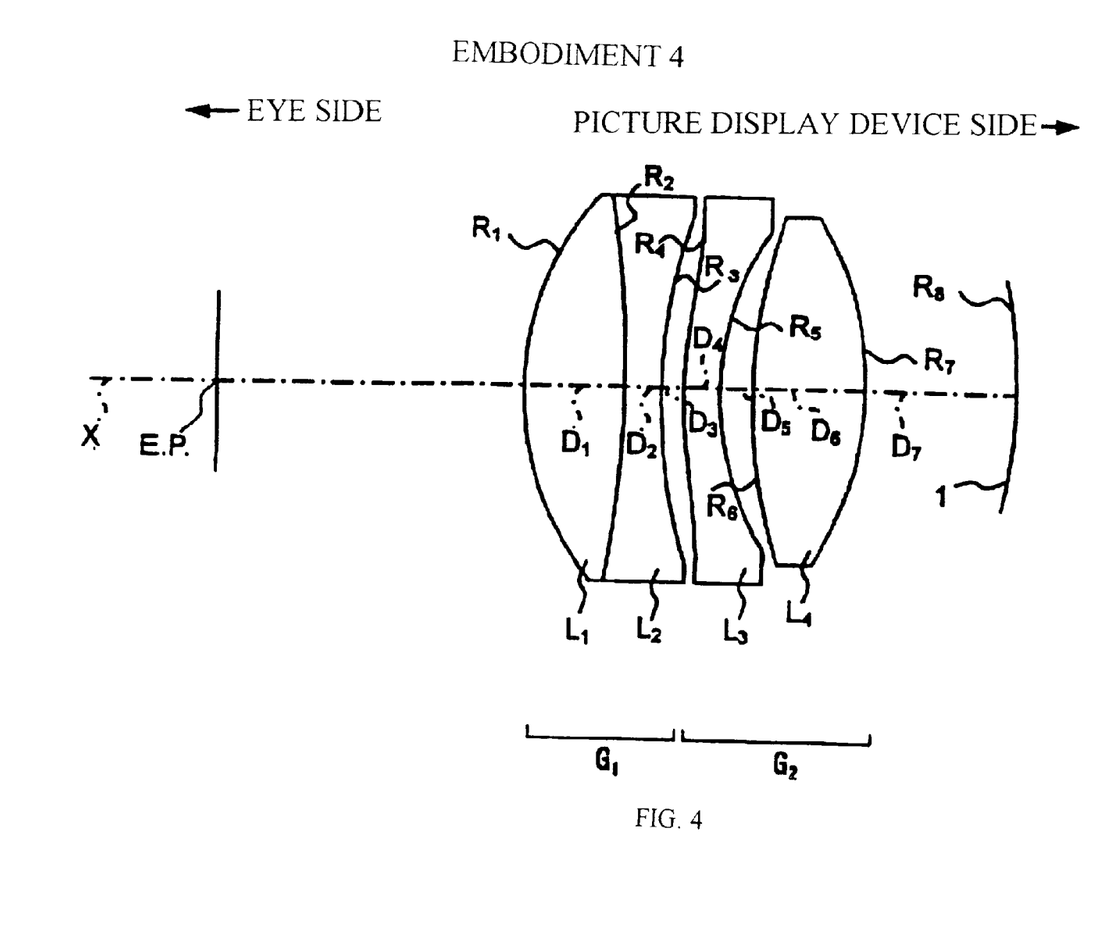
FIG. 4 shows the basic lens element configuration of an eyepiece for a picture display device according to Embodiment 4.

As shown in FIG. 4, the eyepiece of Embodiment 4, differs from the eyepiece of Embodiment 1 in three ways. The first difference is that the first lens group of this embodiment is formed of two lens elements $L_1$ and $L_2$ that are cemented together, with lens element $L_1$ being a biconvex lens having surfaces of different radii of curvature, with the surface having the smaller radius of curvature on the eye side, and the second lens element $L_2$ being a biconcave lens having surfaces of different radii of curvature, with the surface having the smaller radius of curvature on the picture display surface side. The second difference is that the second lens group $G_2$ is formed of only two lens elements. The second lens group $G_2$ includes a third lens element $L_3$ having a negative meniscus shape with its convex surface on the eye side, and a fourth lens element $L_4$ which is a biconvex lens having surfaces of different radii of curvature, with the surface having the smaller radius of curvature on the picture display surface side. The third difference is that the surface of the third lens element $L_3$ on the eye side (surface #4) is both aspherical and includes a DOE surface.

Table 4 below shows the surface number # in order from the eye side, the radius of curvature R (in mm) of each surface, the on-axis spacing between surfaces, as well as the index of refraction $N_d$ and Abbe constant $v_d$ (relative to the sodium d-line, i.e., λ=587.6 nm) of the lens elements of this embodiment. In the middle portion of the table, the values for the coefficients $P_2$, $P_4$ and $P_6$ of Equation (1) above are listed for the DOE surface (surface #4). In the bottom portion of the table, the respective coefficients K, $A_4$, $A_6$, $A_8$ and $A_{10}$ of Equation (2) above which define the shape of the underlying aspherical surface (surface #4) are listed.

Table 5 below lists the respective values of Conditions (1)–(4) (top portion) for each of Embodiments 1–4, as well as the values of f, $f_1$ $f_2$, $fn_1$ and $fn_2$ (bottom portion) for each of Embodiments 1–4. As is clear from the top portion of Table 5, each of Embodiments 1–4 satisfies Conditions (1)–(4).

TABLE 5

| Embodiment #: | 1 | 2 | 3 | 4 |
|---|---|---|---|---|
| Condition (1) value: $f_1/f$ | 1.439 | 1.583 | 1.480 | 1.602 |
| Condition (2) value: $f_2/f$ | 1.626 | 1.515 | 1.593 | 1.345 |
| Condition (3) value: $R_{IM}/f$ | −1.481 | −1.853 | −1.111 | −1.481 |
| Condition (4) value: $f\times\Sigma(1/fn_i)$ | −0.574 | −0.838 | −0.730 | −1.122 |
| f | 27.00 | 26.99 | 27.00 | 27.00 |
| $f_1$ | 38.866 | 42.735 | 39.967 | 43.257 |
| $f_2$ | 43.892 | 40.895 | 43.019 | 36.319 |
| $fn_1$ | −47.061 | −32.219 | −36.966 | −31.877 |
| $fn_2$ | — | — | — | −97.961 |

FIGS. 5A–8J show various aberrations of the different embodiments of the invention. In those figures which illustrate spherical aberrations, the spherical aberration is given for the d line (587.6 nm in wavelength), the C line (656.3 nm in wavelength), and the F line (486.1 nm in wavelength). In those figures which indicate the astigmatism, curves are shown for the astigmatism in the tangential plane T and in the sagittal plane S. Moreover, in all of these figures, ω is the half-field angle.

Figure 5A:
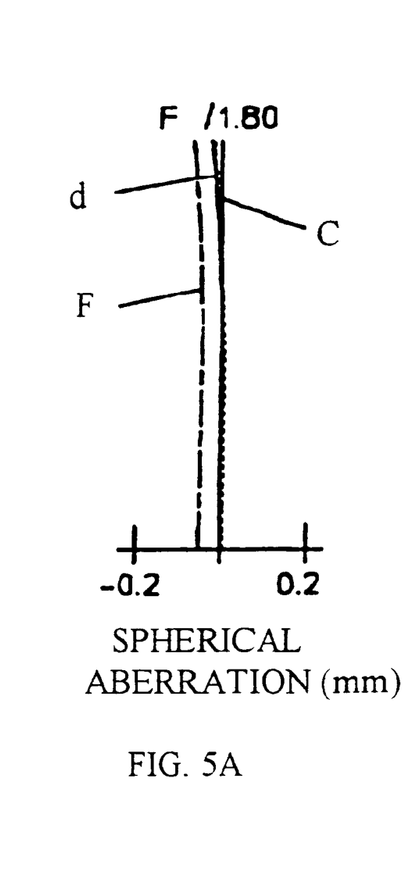
FIGS. 5A–5C show the spherical aberration, astigmatism, and distortion, respectively, of the eyepiece of Embodiment 1.
Figure 5B:
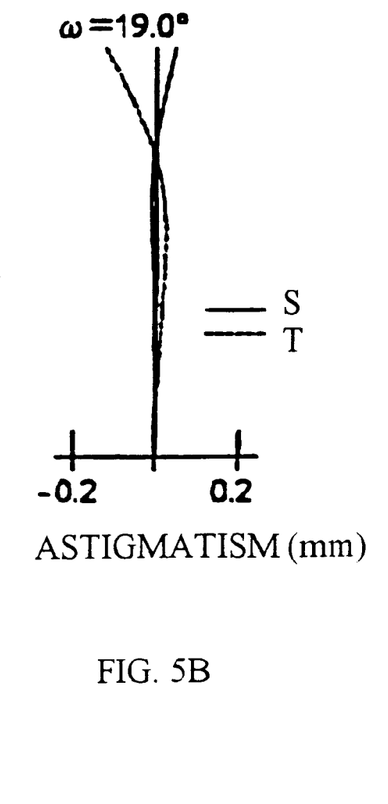
Figure 5C:
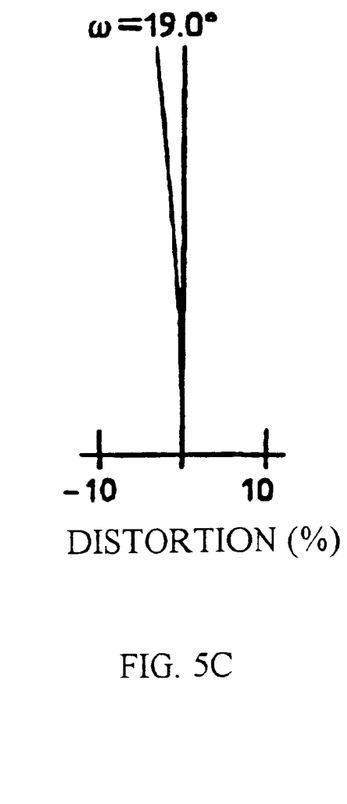
Figure 5D:
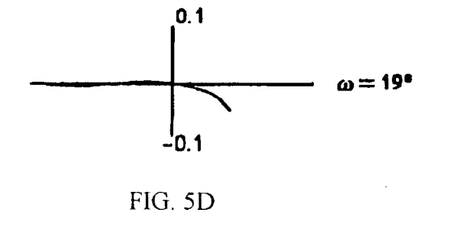
FIGS. 5D–5G show the coma in the tangential plane for various half-field angles ω of the eyepiece of Embodiment 1.
Figure 5E:
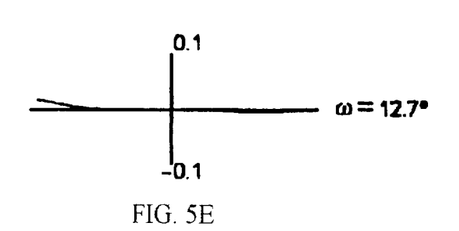
Figure 5F:
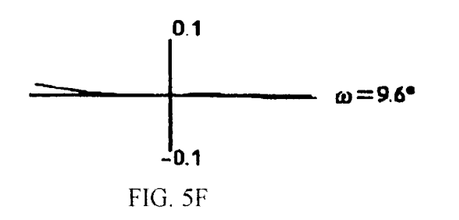
Figure 5G:
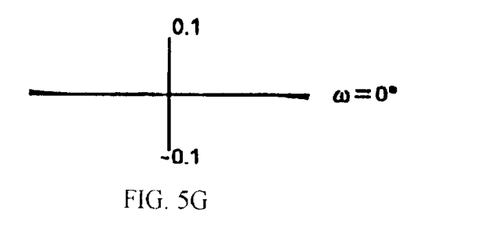

More specifically:

FIGS. 5A–5C show the spherical aberration, astigmatism, and distortion, respectively, of the eyepiece for a picture display device of Embodiment 1,

TABLE 4

| # | R | D | $N_d$ | $V_d$ |
|---|---|---|---|---|
| 1 | 22.000 | 8.348 | 1.85000 | 43.0 |
| 2 | −79.594 | 3.000 | 1.85000 | 22.5 |
| 3 | 41.791 | 1.836 | | |
| 4 (DOE and Aspherical Surface) | 33.981 | 3.000 | 1.78579 | 46.9 |
| 5 | 22.086 | 2.693 | | |
| 6 | 40.347 | 9.183 | 1.58595 | 61.1 |
| 7 | −24.119 | 12.318 | | |
| 8 (Picture Display Surface) | −40.000 | | | |

DOE Surface (Surface #4)

| $P_2$ | $P_4$ | $P_6$ | $P_8$ | $P_{10}$ |
|---|---|---|---|---|
| −4.3579121 | −1.2832993 × 10⁻² | 8.3366777 × 10⁻⁵ | 4.6195478 × 10⁻⁸ | 2.4189716 × 10⁻¹² |

Aspherical Surface (Surface #4)

| K | $A_4$ | $A_6$ | $A_8$ | $A_{10}$ |
|---|---|---|---|---|
| 1.0000000 | −3.9508521 × 10⁻⁵ | −2.7021776 × 10⁻⁸ | −3.2980479 × 10⁻¹⁰ | 1.6341663 × 10⁻¹² |

Figure 5H:
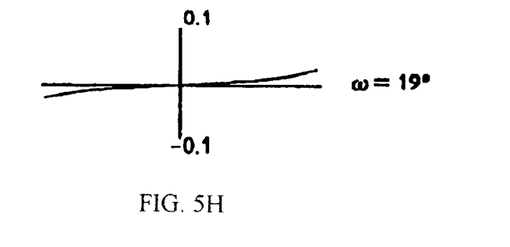
FIGS. 5H–5J show the coma in the sagittal plane for various half-field angles ω of the eyepiece of Embodiment 1.
Figure 5I:
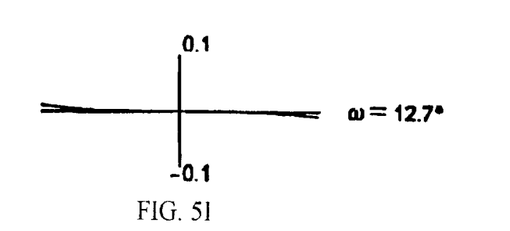
Figure 5J:
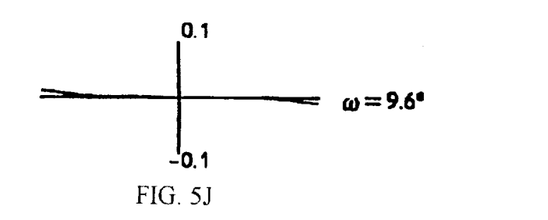
Figure 6A:
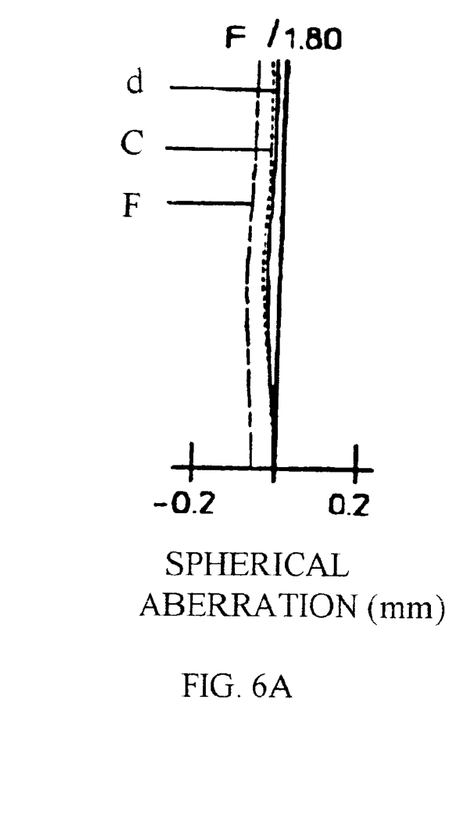
FIGS. 6A–6C show the spherical aberration, astigmatism, and distortion, respectively, of the eyepiece of Embodiment 2.
Figure 6B:
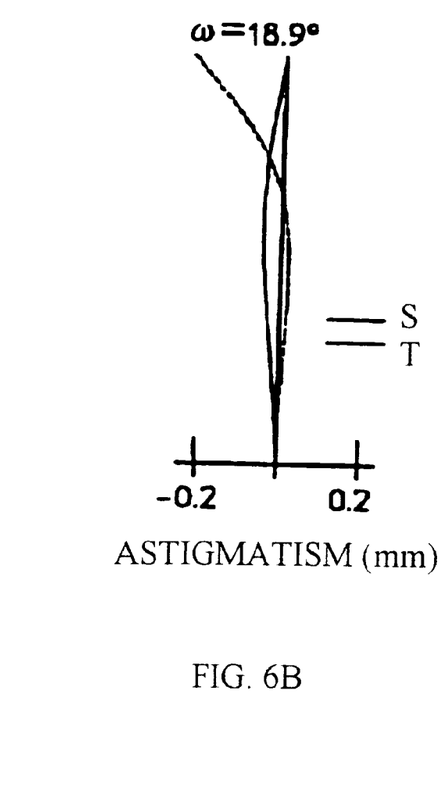
Figure 6C:
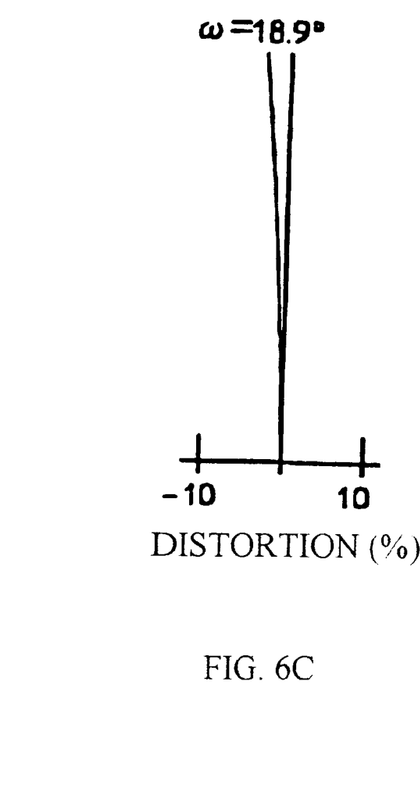
Figure 6D:
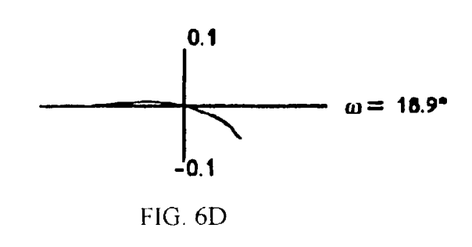
FIGS. 6D–6G show the coma in the tangential plane for various half-field angles ω of the eyepiece of Embodiment 2.
Figure 6E:
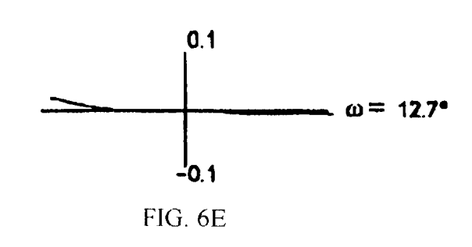
Figure 6F:
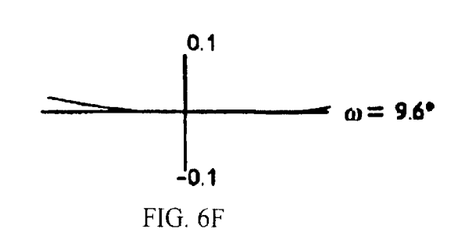
Figure 6G:
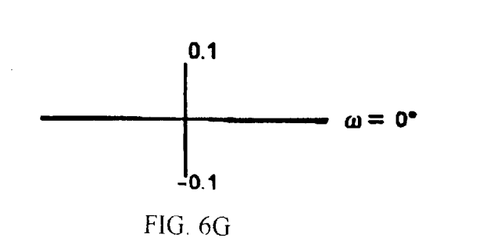
Figure 6H:
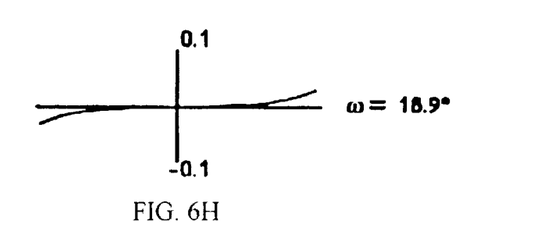
FIGS. 6H–6J show the coma in the sagittal plane for various half-field angles ω of the eyepiece of Embodiment 2.
Figure 6I:
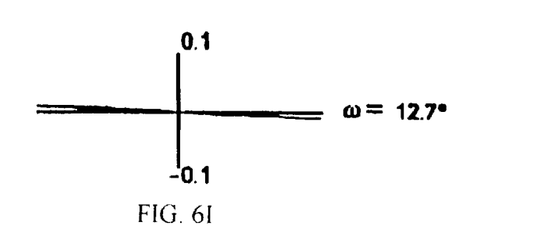
Figure 6J:
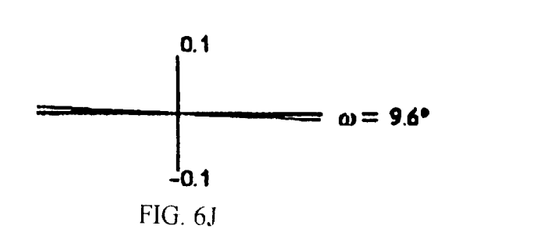
Figure 7A:
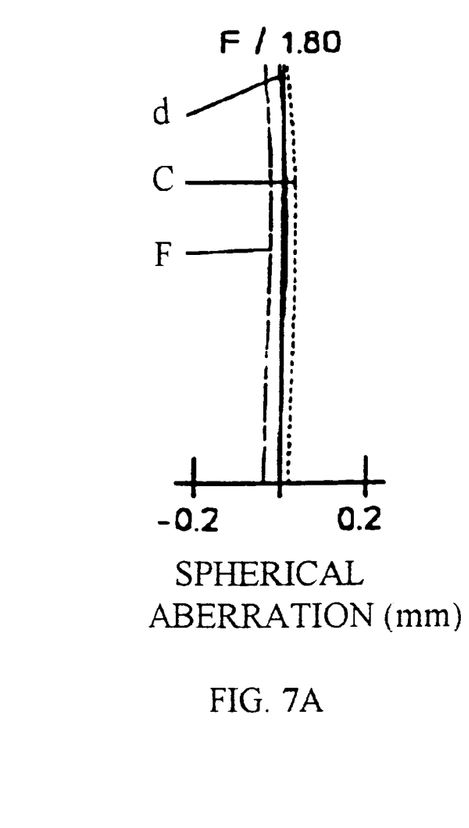
FIGS. 7A–7C show the spherical aberration, astigmatism, and distortion, respectively, of the eyepiece of Embodiment 3.
Figure 7B:
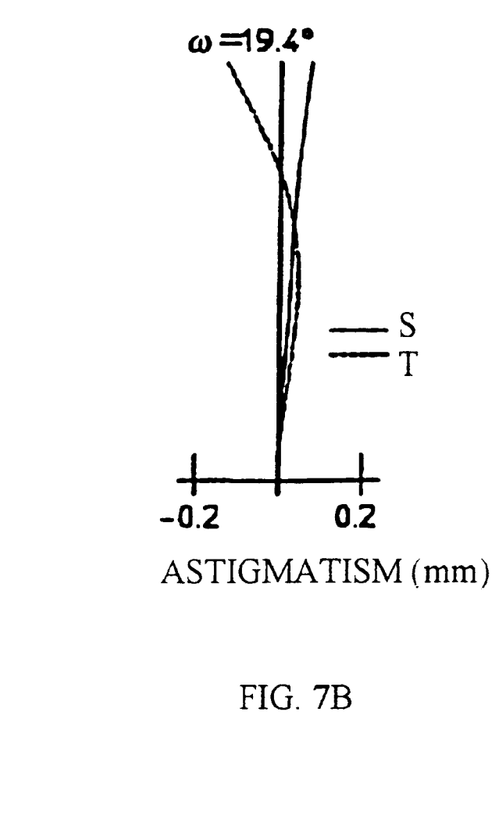
Figure 7C:
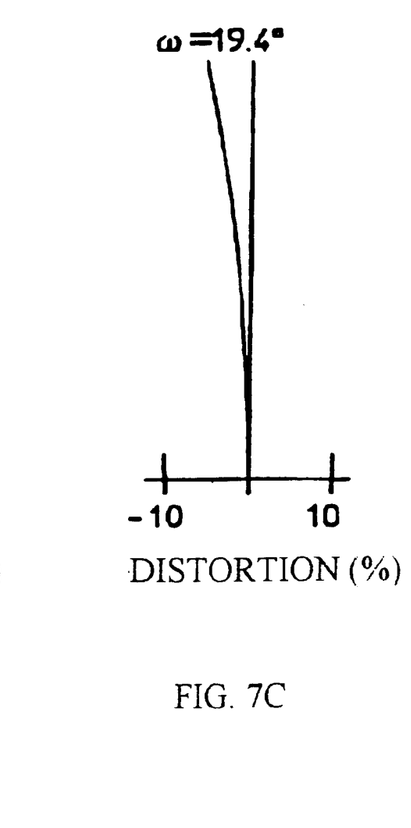
Figure 7D:
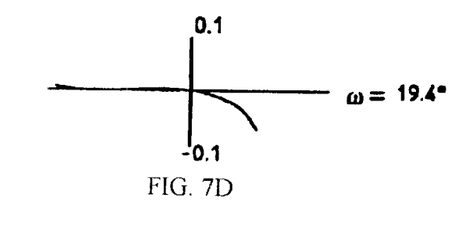
FIGS. 7D–7G show the coma in the tangential plane for various half-field angles ω of the eyepiece of Embodiment 3.
Figure 7E:
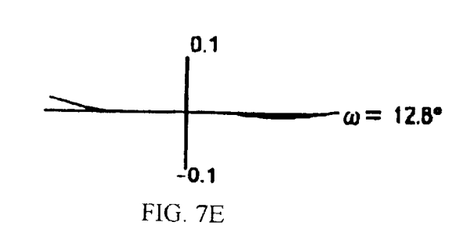
Figure 7F:
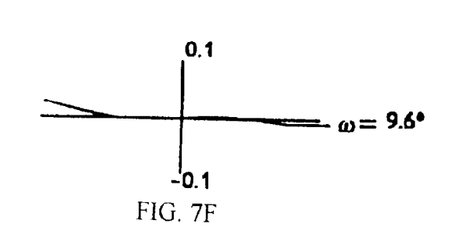
Figure 7G:
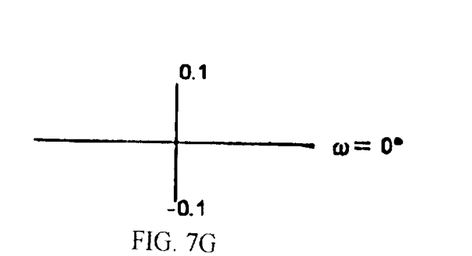
Figure 7H:
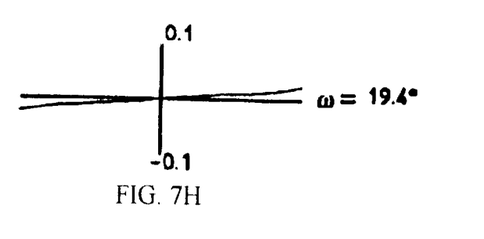
FIGS. 7H–7J show the coma in the sagittal plane for various half-field angles ω of the eyepiece of Embodiment 3.
Figure 7I:
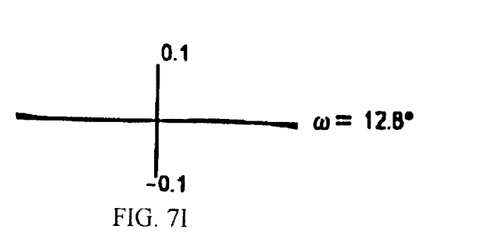
Figure 7J:
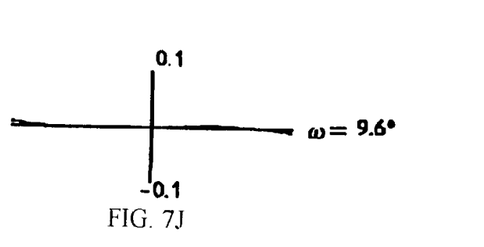
Figure 8A:
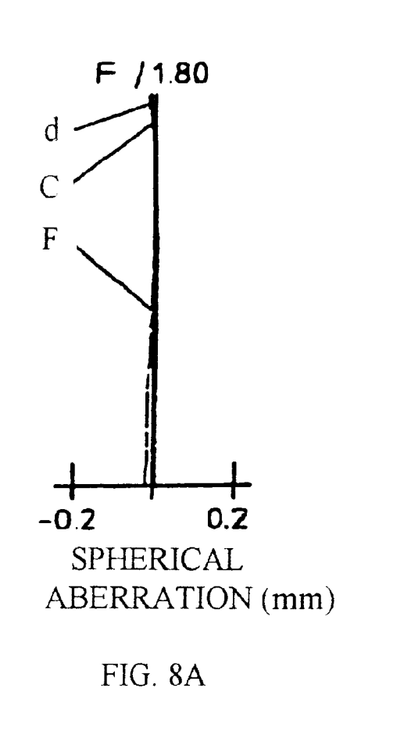
FIGS. 8A–8C show the spherical aberration, astigmatism, and distortion, respectively, of the eyepiece of Embodiment 4.
Figure 8B:
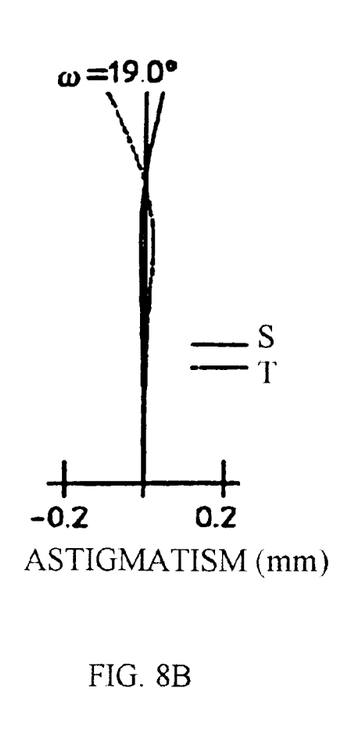
Figure 8C:
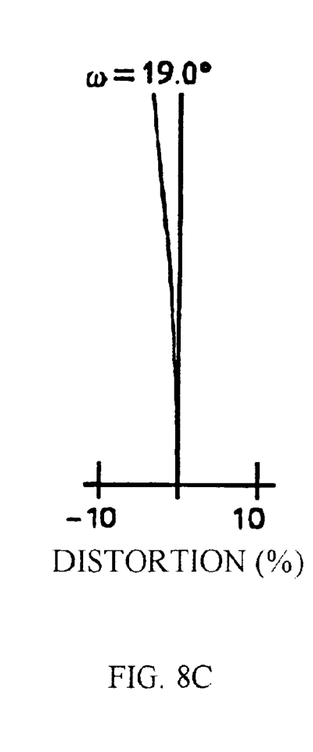
Figure 8D:
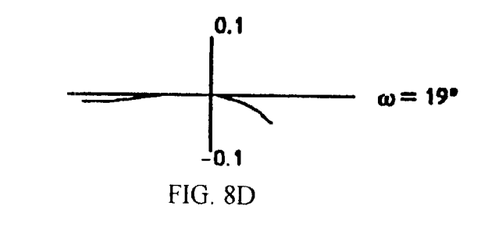
FIGS. 8D–8G show the coma in the tangential plane for various half-field angles ω of the eyepiece of Embodiment 4.
Figure 8E:
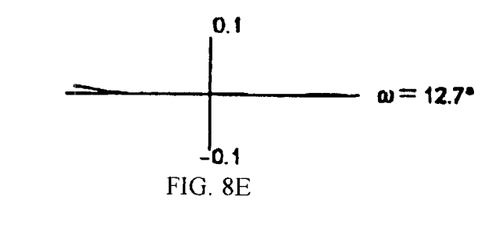
Figure 8F:
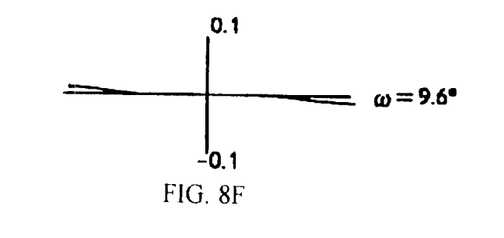
Figure 8G:
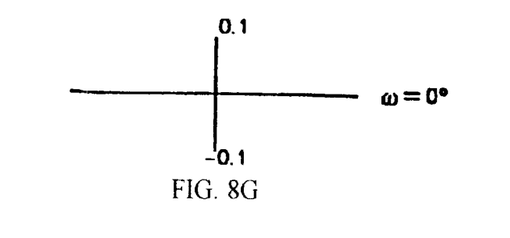
Figure 8H:
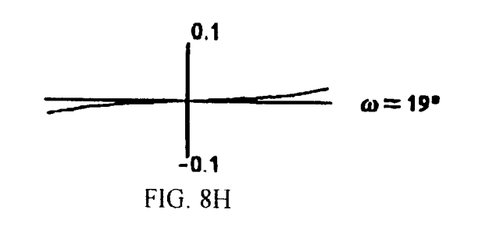
FIGS. 8H–8J show the coma in the sagittal plane for various half-field angles ω of the eyepiece of Embodiment 4.
Figure 8I:
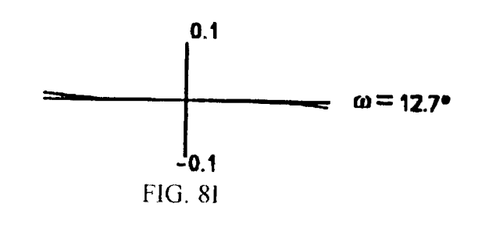
Figure 8J:
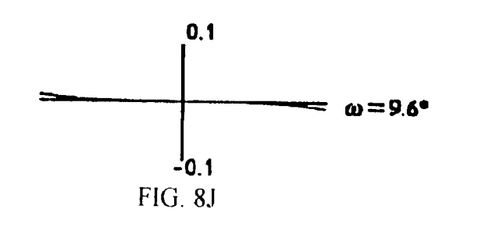

FIGS. 5D–5G show the coma (the vertical axis dimension is in mm) in the tangential plane for various half-field angles ω of the eyepiece of Embodiment 1, FIGS. 5H–5J show the coma (the vertical axis dimension is in mm) in the sagittal plane for various half-field angles ω of the eyepiece of Embodiment 1, FIGS. 6A–6C show the spherical aberration, astigmatism, and distortion, respectively, of the eyepiece for a picture display device of Embodiment 2, FIGS. 6D–6G show the coma (the vertical axis dimension is in mm) in the tangential plane for various half-field angles ω of the eyepiece of Embodiment 2, FIGS. 6H–6J show the coma (the vertical axis dimension is in mm) in the sagittal plane for various half-field angles ω of the eyepiece of Embodiment 2, FIGS. 7A–7C show the spherical aberration, astigmatism, and distortion, respectively, of the eyepiece for a picture display device of Embodiment 3, FIGS. 7D–7G show the coma (the vertical axis dimension is in mm) in the tangential plane for various half-field angles ω of the eyepiece of Embodiment 3, FIGS. 7H–7J show the coma (the vertical axis dimension is in mm) in the sagittal plane for various half-field angles ω of the eyepiece of Embodiment 3, FIGS. 8A–8C show the spherical aberration, astigmatism, and distortion, respectively, of the eyepiece for a picture display device of Embodiment 4, FIGS. 8D–8G show the coma (the vertical axis dimension is in mm) in the tangential plane for various half-field angles ω of the eyepiece of Embodiment 4, and FIGS. 8H–8J show the coma (the vertical axis dimension is in mm) in the sagittal plane for various half-field angles ω of the eyepiece of Embodiment 4.

Each of the eyepieces relating to Embodiments 1 to 4 are bright with the F-number of 1.80. Additionally, as shown in Table 5, the focal length f of each embodiment is roughly 27 mm. Therefore, the eyepieces relating to the embodiments have a large exit pupil diameter of 15 mm. It is also clear from FIGS. 5A–8J that the various aberrations are favorably corrected, so as to enable the eyepiece to provide high quality images. Thus, the present invention provides an eyepiece for a picture display device so that an observer can observe high quality images even under conditions of motion such as walking, riding in a vehicle, and the like.

The invention being thus described, it will be obvious that the same may be varied in many ways. For example, the radius of curvature R of the respective lenses and the surface spacings D may be appropriately scaled for any desired focal length. Additionally, even if a DOE surface or an aspherical surface is formed at other lens surfaces, effects similar to those of the embodiments mentioned above are obtainable. Such variations are not to be regarded as a departure from the spirit and scope of the invention. Rather the scope of the invention shall be defined as set forth in the following claims and their legal equivalents. All such modifications as would be obvious to one skilled in the art are intended to be included within the scope of the following claims.

What is claimed is:

1. An eyepiece for a picture display device, said eyepiece consisting of:

two lens groups;

the first lens group, in order from the eye side, having positive refractive power with its surface nearest the eye side being convex and its surface farthest from the eye side being concave, said first lens group consisting of either a single lens element or a pair of lens elements that are cemented together;

wherein, among the two lens groups, the eyepiece includes at least one negative lens element, at least two positive lens elements, and at least one diffraction optical element surface.

2. The eyepiece of claim 1, wherein the following condition is satisfied:

$$1.1 < f_1/f < 2.0$$

where $f_1$ is the focal length of the first lens group, and f is the focal length of the eyepiece.

3. The eyepiece of claim 1, wherein the following condition is satisfied:

$$1.0 < f_2/f < 2.0;$$

where $f_2$ is the focal length of the second lens group, and f is the focal length of the eyepiece.

4. The eyepiece of claim 1, wherein the following condition is satisfied:

$$-2.0 < R_{IM}/f < -1.0$$

where $R_{IM}$ is the radius of curvature of the picture display surface, and f is the focal length of the eyepiece.

5. The eyepiece of claim 1, wherein the following condition is satisfied:

$$-1.4 < f \times \Sigma(1/fn_i) < -0.4$$

where f is the focal length of the eyepiece, and $\Sigma(1/fn_i)$ is the reciprocal of the focal length $fn_i$ of the negative lens element of the eyepiece where there is only one negative lens element in the eyepiece, or is the sum of reciprocals of the focal lengths of the negative lens elements of the eyepiece where there is more than one negative lens element in the eyepiece.

6. The eyepiece for a picture display device according to claim 1, wherein one of the lens element surfaces of the eyepiece is aspherical.

7. The eyepiece for a picture display device according to claim 2, wherein one of the lens element surfaces of the eyepiece is aspherical.

8. The eyepiece for a picture display device according to claim 3, wherein one of the lens element surfaces of the eyepiece is aspherical.

9. The eyepiece for a picture display device according to claim 4, wherein one of the lens element surfaces of the eyepiece is aspherical.

10. The eyepiece for a picture display device according to claim 5, wherein one of the lens element surfaces of the eyepiece is aspherical.

* * * * *

UNITED STATES PATENT AND TRADEMARK OFFICE
CERTIFICATE OF CORRECTION

PATENT NO.    : 6,414,798 B1
DATED         : July 2, 2002
INVENTOR(S)   : Koizumi It is certified that error appears in the above-identified patent and that said Letters Patent is hereby corrected as shown below:

Title page,
Item [56], References Cited, FOREIGN PATENT DOCUMENTS, change
"JP  2000-1053244  4/2000" to -- JP  2000-105344  4/2000 --;
Table 2, third line from the bottom, change the value of $P_4$ from "3.6340439 x $10^3$" to
-- 3.6340439 x $10^{-3}$ --; and
Table 2, bottom line, change the value of $A_4$ from "-2.1348974 x $10^5$" to
-- -2.1348974 x $10^{-5}$ --

Signed and Sealed this

Nineteenth Day of November, 2002

Attest:

JAMES E. ROGAN
Attesting Officer    Director of the United States Patent and Trademark Office